United States Patent [19]

Kitagawa et al.

[11] Patent Number: 5,201,251
[45] Date of Patent: Apr. 13, 1993

[54] SHIFT CONTROL APPARATUS FOR AUTOMATIC TRANSMISSION FOR VEHICLE

[75] Inventors: Takeshi Kitagawa, Kyoto; Hiroshi Takuma, Kameoka; Shoji Kan, Kyoto; Yoichi Furuichi, Kyoto; Takahiro Taki, Kyoto, all of Japan

[73] Assignee: Mitsubishi Jidosha Kogyo Kabushiki Kaisha, Tokyo, Japan

[21] Appl. No.: 917,168

[22] Filed: Jul. 17, 1992

[30] Foreign Application Priority Data

Jul. 31, 1991 [JP] Japan .................................. 3-192358

[51] Int. Cl.$^5$ .............................................. F16H 59/48
[52] U.S. Cl. ..................................... 74/862; 364/424.1
[58] Field of Search ......................... 74/862; 364/424.1

[56] References Cited

U.S. PATENT DOCUMENTS

| 5,085,104 | 2/1992 | Konno et al. | 364/424.1 X |
| 5,103,693 | 4/1992 | Hibi | 74/862 X |
| 5,113,718 | 5/1992 | Sato | 74/862 X |
| 5,152,192 | 10/1992 | Koenig et al. | 74/862 |

Primary Examiner—Dirk Wright
Attorney, Agent, or Firm—Abelman Frayne & Schwab

[57] ABSTRACT

In an automatic transmission for a vehicle having at least one frictional engaging element and an electromagnetic valve to control hydraulic pressure supplied to the frictional engaging element and achieving a plurality of speed ratios including a predetermined speed ratio achieved by engaging the frictional engaging element, a shift control apparatus includes retardation rate detection means for detecting retardation rate of the vehicle and electromagnetic valve control means for controlling the electromagnetic valve according to the value detected by the retardation rate detection means, and hydraulic pressure supplied to the frictional engaging element is corrected by the electromagnetic valve through electromagnetic valve control means according to the retardation rate of the vehicle detected by the retardation rate detection means, thereby reducing speed-shift shocks during a down-shift in association with retardation of the vehicle.

6 Claims, 7 Drawing Sheets

| Frictional engaging element \ Speed ratio | N,P | 1st | 2nd | 3rd | 4th | R |
|---|---|---|---|---|---|---|
| Front clutch 20 | | | | | | ○ |
| Rear clutch 21 | | ○ | ○ | ○ | | |
| 4th speed clutch 22 | | | | ○ | ○ | |
| Kickdown brake 23 | | | ○ | | ○ | |
| Low reverse brake 24 | | ● | | | | ○ |

SHIFT CONTROL APPARATUS FOR AUTOMATIC TRANSMISSION FOR VEHICLE

BACKGROUND OF THE INVENTION

This invention relates to a shift control apparatus used in an automatic transmission for a vehicle having at least one frictional engaging element and an electromagnetic valve to control the hydraulic pressure supplied to the frictional engaging element and achieving a plurality of speed ratios including a predetermined speed ratio achieved by engaging the frictional engaging element, to reduce speed shift shocks during a down shift in association with retardation of the vehicle.

The automatic transmission for a vehicle selectively supplies hydraulic fluid to frictional engaging elements such as clutches and breaks to connect a desired rotatory element in its gear system to an input shaft of the transmission or fix the element to a transmission casing, thereby automatically changing the speed ratio according to operation conditions of the vehicle.

Such an automatic transmission for a vehicle is required to be small in speed-shift shocks to protect various parts and components and maintain comfortable drive feeling. For this purpose, an automatic transmission for a vehicle has been proposed which uses a proper electronic control over the hydraulic pressure and its supply timing to frictional engaging elements, aiming for reduced speed-shift shocks.

Figure 6:
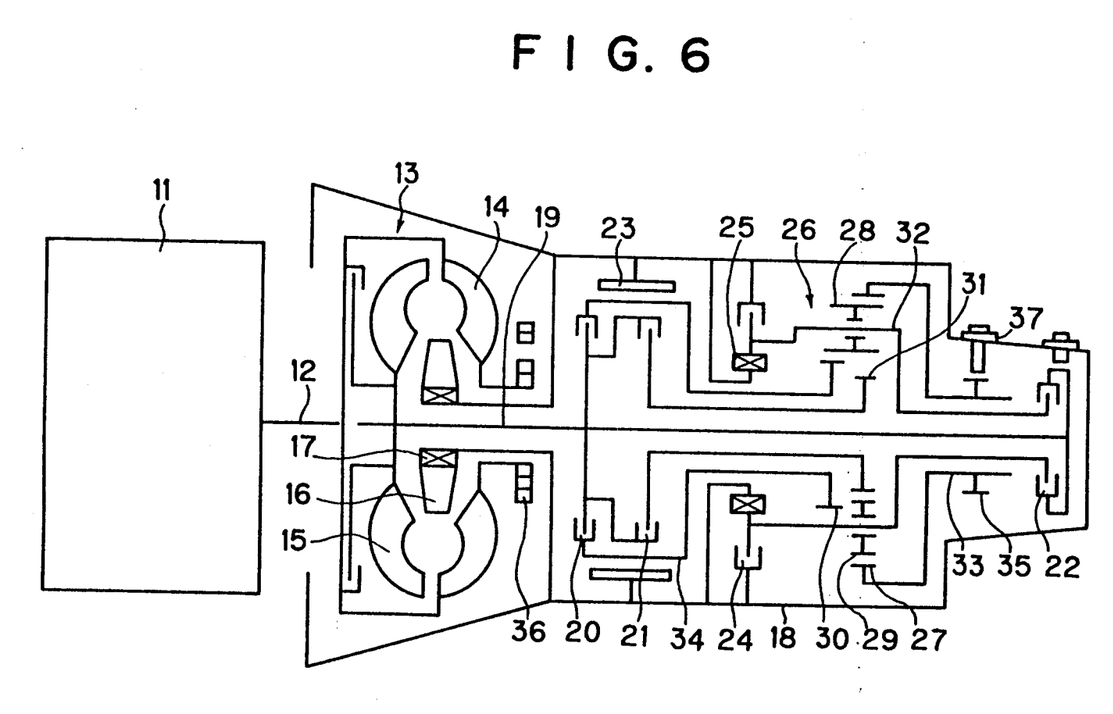
FIG. 6 is a skeletal view showing the structure of an automatic transmission for a vehicle of four forward speeds used in the present invention.

An example of the structure of such an automatic transmission for a vehicle is shown in FIG. 6.

Referring to FIG. 6, a crack shaft 12 of an engine 11 is integrally connected with an impeller 14 of a torque converted 13. The torque converter has the impeller 14, a turbine 15, a stator 16, and a one-way clutch 17. The stator 16 is connected to a transmission case 18 by the one-way clutch 17. By the function of the one-way clutch, the stator is allowed to rotate in the same direction as the crank shaft 12 but is not allowed to rotate in the reverse direction. The torque transmitted to the turbine 15 is transmitted to the input shaft 19 (hereinafter referred to as the "transmission input shaft") of the gear transmission apparatus to achieve four forward speeds and a single reverse speed disposed at the rear of the torque converter 13.

The gear transmission apparatus comprises three clutches 20, 21, and 22, two breaks 23 and 24, one one-way clutch 25, and one ravigneaux type planetary gear mechanism 26. The ravigneaux type planetary gear mechanism 26 comprises a ring gear 27, a long pinion gear 28, a short pinion gear 29, a front sun gear 30, a rear sun gear 31, and a carried 32. The carrier 32 rotatably supports the pinion gears 28 and 29 and is rotatably engaged with the transmission input shaft 19.

The ring gear 27 connected to a transmission output shaft 33. The front sun gear 30 is connected to the transmission input shaft 19 through a kickdown drum 34 and a front clutch 20. Furthermore, the rear sun gear 31 is connected to the transmission input shaft 19 through a rear clutch 21. The carrier 32 is connected to a transmission casing 18 through a low reverse break 24 and the one-way clutch 25 and to the transmission input shaft 19 through a 4th-speed clutch 22 disposed at the rear end of the gear transmission apparatus. The kickdown drum 34 is integrally connectable to the transmission casing 18 by a kickdown break 23. Torque passed through the ravigneaux type planetary gear mechanism 26 is transmitted from a drive gear 35 mounted to the transmission output shaft 33 to the drive shaft side of driving wheels (not shown).

The clutches 20 to 22 and the breaks 23 and 24 as frictional engaging elements individually comprises hydraulic mechanisms provided with engaging piston devices or servo mechanisms. These hydraulic mechanisms are operated through a hydraulic control unit (not shown) by hydraulic fluid generated by an oil pump 36 connected to the impeller 14 of the torque converted 13.

Detailed structure an functions of the mechanisms are already known, for example, in Japanese Patent Publication Laid-open 58-46248/1983, 58-54270/1983, or 61-31749/1986. Thus, selective engagement of various frictional engaging elements is achieved according to the position of a shift lever provided beside the driver's seat of the vehicle (not shown) selected by the driver and operation conditions of the vehicle, and various speed ratios are automatically achieved through the hydraulic control unit according to instructions from an electronic control unit to control the operation conditions of the engine 11.

Figure 7:
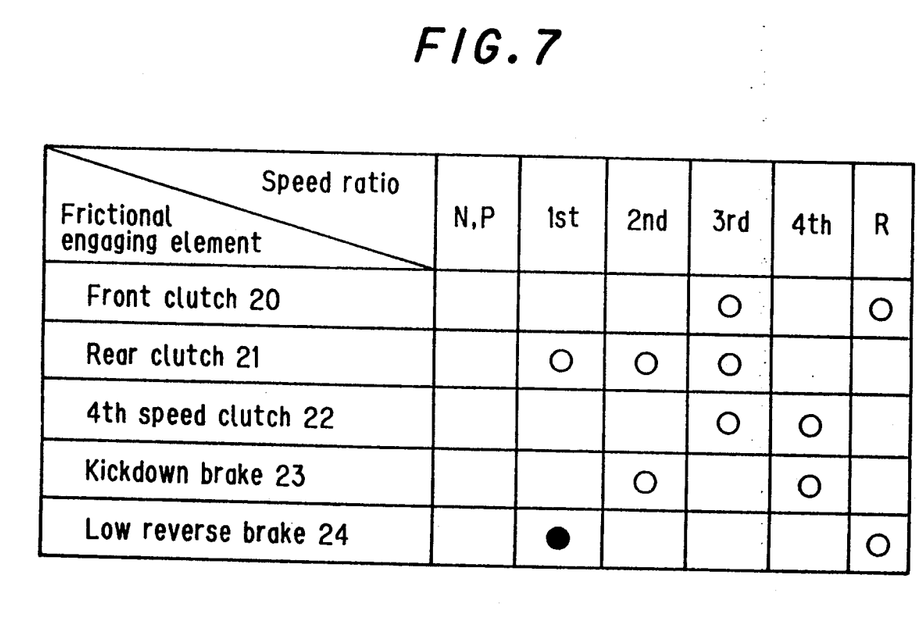
FIG. 7 is an operation element chart showing the relationship between the engaging condition of the individual frictional engaging elements and speed ratios.

The select pattern of the shift lever includes P (parking), R (reverse), N (neutral), D (automatic three forward speeds or automatic four forward speeds), 2 (automatic two forward speeds), and L (fixed to the 1st speed) positions. With the shift lever set to the D position, when an auxiliary switch (over-drive switch, not shown) is operated, the automatic three forward speeds or the automatic four forward speeds can be selected. The functions of the individual frictional engaging elements when the shift lever is set to the individual positions are shown in FIG. 7. In the figure, symbol "●" indicates that the engaging is achieved only when the L position is selected.

In the past, when the making an automatic down-shift in association with retardation of a vehicle equipped with such an automatic transmission, a speed ratio according to the current vehicle speed and the throttle opening has been read from a graph which is predetermined according to the vehicle speed and the throttle opening representing the load to the engine 11. When the current speed ratio differs from a speed ratio read from the graph, a hydraulic control valve is driven at a predetermined duty ratio to supply a predetermined engaging hydraulic pressure to the engaging side frictional engaging element, in order to achieve the newly read speed ratio.

In a prior art automatic transmission for a vehicle for a vehicle shown in FIG. 6 and FIG. 7 in which a plurality of speed ratios are achieved by electronically controlling hydraulic pressures to a plurality of frictional engaging elements to selectively engage these frictional engaging elements, the hydraulic control value is driven at a predetermined duty ratio so that a predetermined hydraulic pressure is supplied to the engaging side frictional engaging element independent of the retardation rate of the vehicle.

As a result, there occurs a difference in hydraulic pressure supplied to the engaging side frictional engaging element between a rapid retardation when the break pedal is rapidly pressed down and a moderate retardation when the bake pedal is not pressed down.

For example, when control is set so that speed-shift shocks are reduced at a down-shift in association with a moderate retardation of the vehicle, the hydraulic pressure supplied to the engaging side frictional engaging element tends to become too low because the engine speed rapidly decreases at a down-shift in association with rapid braking of the vehicle. As a result, large speed-shift shocks tend to occur due to a delay in engaging the engagingr142e frictional engaging element.

On the contrary, when the control is set so that speed-shift shocks are reduced at a down-shift in association with a rapid retardation of the vehicle, a high hydraulic pressure is supplied to the engaging side frictional engaging element at a down-shift in association with a moderate retardation of the vehicle where almost no decrease occurs in the engine speed. As a result, engaging of the engaging side frictional engaging elements tends to be too early, resulting in high speed-shift shocks.

OBJECT OF THE INVENTION

With a view to eliminated the above prior art problems with automatic transmissions for a vehicle, it is a primary object of the present invention to provide a shift control apparatus for use in an automatic transmission for a vehicle having at least one frictional engaging element and an electromagnetic valve to control the hydraulic pressure supplied to the frictional engaging element and achieving a plurality of speed ratios including a predetermined speed ratio achieved by engaging the frictional engaging element, to reduce speed-shift shocks at a down shift in association with retardation of the vehicle, compared to prior art apparatus.

SUMMARY OF THE INVENTION

In accordance with the present invention, in an automatic transmission for a vehicle having at least one frictional engaging element and an electromagnetic valve to control hydraulic pressure supplied to the frictional engaging element and achieving a plurality of speed ratios including a predetermined speed ratio achieved by engaging the frictional engaging element, a shift control apparatus comprises retardation rate detection means for detecting retardation rate of the vehicle and electromagnetic valve control means for controlling the electromagnetic valve according to the value detected by the retardation rate detection means.

The electromagnetic valve control means may be one which controls the electromagnetic valve according to the value detected by the retardation rate detection means during a shift from another speed ratio to the above predetermined speed ratio. In this case, speed shift instruction means may be provided which instructs a shift operation to a predetermined speed ratio when the above other speed ratio is higher by two steps or more than the predetermined speed ratio and the present vehicle speed is higher than a predetermined value.

The retardation rate detection means may be provided with output shaft rotation speed detection means for detecting the rotation speed of the output shaft of the automatic transmission to calculate the retardation rate of the vehicle according to the rate of change in the output shaft rotation speed.

Similarly, it is also possible to provided input shaft rotation speed detection means in the retardation rate detection means for detecting the rotation speed of the input shaft of the automatic transmission to calculate the retardation rate according to the rate of change in the input shaft rotation speed.

Alternatively, the retardation rate detection means may be provided with acceleration detection means for detecting the acceleration of the vehicle to calculate the retardation rate of the vehicle according to the output value from the acceleration detection means.

Therefore, when the retardation rate detection means determines that the retardation rate of the vehicle is high, that is, a down-shift at a rapid retardation, the hydraulic pressure supplied to the engaging side frictional engaging element is set higher by the electromagnetic valve control means through the electromagnetic valve to prevent speed-shift shocks in association with a delay in engaging the engaging side frictional engaging element. This allows the engaging side frictional engaging element to engage at a proper timing, thereby achieving a down-shift with reduced speed-shift shocks.

On the contrary, when the retardation rate detection means determines that the retardation rate of the vehicle is small, that is, a down-shift at a moderate retardation of the vehicle, the hydraulic pressure supplied to the engaging side frictional engaging element is set lower by the electromagnetic valve control means through the electromagnetic valve to prevent too early engagement of the engaging side frictional engaging element. This allows the engaging side frictional engaging element to engage at a proper timing, thereby achieving a down-shift with reduced speed-shift shocks.

As described above, with the shift control apparatus for an automatic transmission for a vehicle according to the present invention, the hydraulic pressure supplied to the frictional engaging element is corrected according to the retardation rate of the vehicle. As a result, when the retardation rate of the vehicle is too high, that is, a down-shift at a rapid retardation, the hydraulic pressure supplied to the engaging side frictional engaging element is set higher to allow the engaging side frictional engaging element to engage at a proper timing. On the contrary, when the retardation rate of the vehicle is small, that is, a down-shift at a moderate retardation of the vehicle, the hydraulic pressure supplied to the engaging side frictional engaging element is set lower to engage the engaging side frictional engaging element at a proper timing. As a result, a down-shift with reduced speed-shift shocks in any case.

DETAILED DESCRIPTION OF THE PREFERRED EMBODIMENT

An embodiment in which the shift control apparatus for an automatic transmission for a vehicle according to the present invention is applied to a vehicle equipped with an automatic transmission of four forward speeds shown in FIG. 6 and FIG. 7 will now be described.

In this embodiment, the retardation rate of the vehicle is calculated according to a rate $\alpha$ (rpm/sec$^2$) of change in rotation speed of a transmission output shaft 33. For this purpose, a rotation speed sensor 37 for detecting the rotation speed of the transmission output shaft 33 is provided at the rear end of a transmission casing 18. Detection signal of the rotation speed sensor 37 is outputted to an electronic control unit to control the operation condition of an engine 11, and the electronic control unit calculates the retardation rate of the vehicle.

Figure 3:
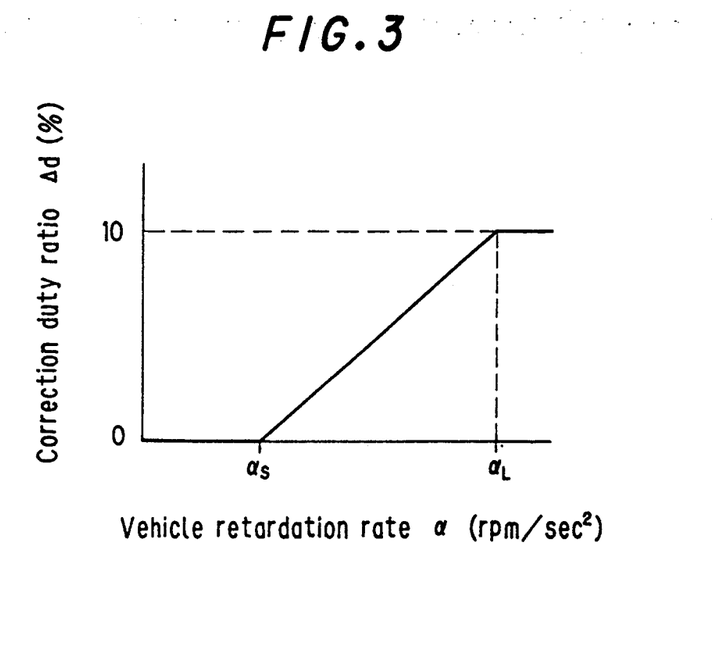
FIG. 3 is a graph showing the relationship between a retardation rate of the vehicle and a corrected duty ratio in this embodiment.

Thus, the retardation rate of the vehicle is calculated by the electronic control unit according to the detection signal from the rotation speed sensor 37. Then, a correction duty ratio $\Delta d$ to a basic duty ratio $d_B$ of a hydraulic control valve to control the engaging hydraulic pressure to the engaging side frictional engaging element is read from a graph as shown in FIG. 3 according the magnitude of retardation rate of the vehicle. And, a final target duty ratio $d_O$ for the hydraulic control valve is calculated.

Figure 4:
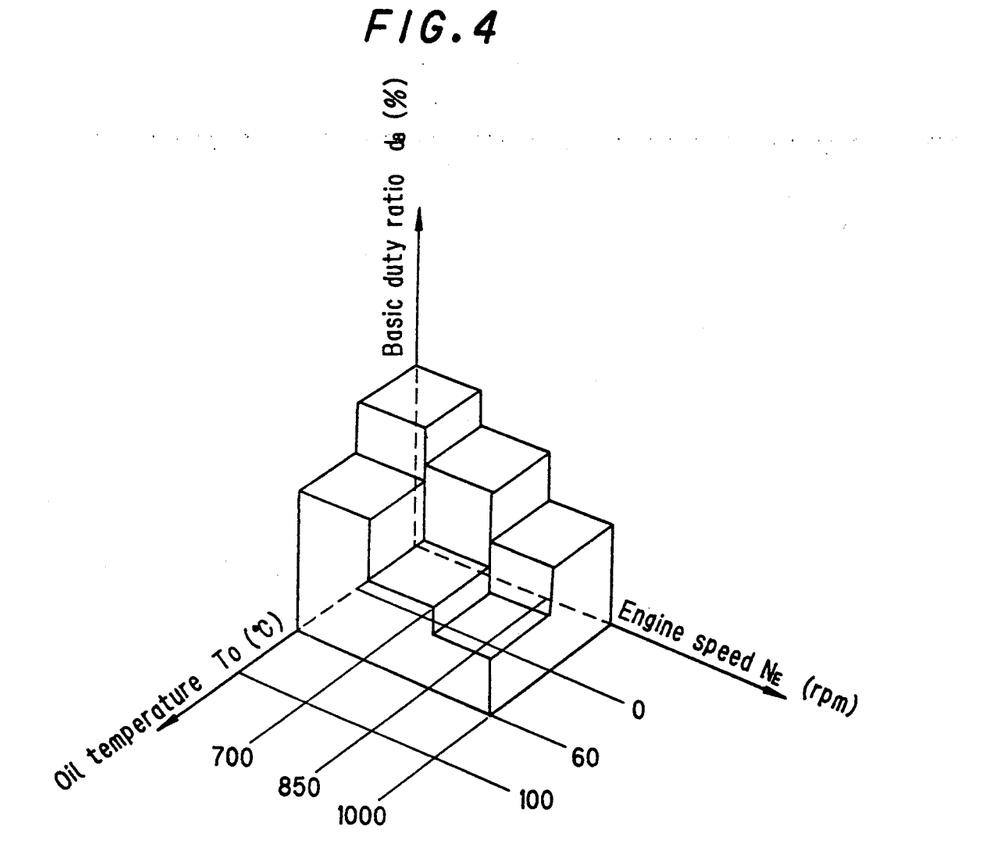
FIG. 4 is a three-dimensional graph showing the relationship between the oil temperature of the automatic transmission for a vehicle and the engine speed and a target duty ratio in this embodiment.

In this case, the basic duty ratio $d_B$ is previously stored in the electronic control unit as a three-dimensional graph as shown in FIG. 4 using an oil temperature $T_O$ of the automatic transmission hydraulic fluid and a engine speed $N_E$ as variables. Therefore, the target duty ratio $D_O$ of the hydraulic control valve is calculated by adding the basic duty ratio $d_B$ and the correction duty ratio $\Delta d$ by the following equation:

$$d_O = d_B + \Delta d$$

Specifically, when the rate $\alpha$ of change in rotation speed of the transmission output shaft 33 (hereinafter referred to as the "vehicle retardation rate") is smaller than a predetermined smallest threshold value $\alpha_S$, the correction duty ratio $\Delta d$ is set to $$\Delta d = 0\%$$

On the contrary, when the vehicle retardation rate $\alpha$ is greater than a largest threshold value $\alpha_L$, the correction duty ratio $\Delta d$ is set to $$\Delta d = -10\%$$

Furthermore, when the vehicle retardation rate $\alpha$ is greater than the smallest threshold value $\alpha_S$ and smaller than the largest threshold value $\alpha_L$, the correction duty ratio $\Delta d$ is set to $$\Delta d = -10 \cdot \alpha/(\alpha_L - \alpha_S)\%.$$

Since this embodiment uses a hydraulic control valve of a type which closes when unenergized, the higher the duty ratio, the lower hydraulic pressure tends to be supplied to the engaging side frictional engaging element. On the other hand, when a hydraulic control valve of a type which opens when unenergized is used, the higher the duty ratio, the higher hydraulic pressure tends to be supplied to the engaging side frictional engaging element.

Figure 5:
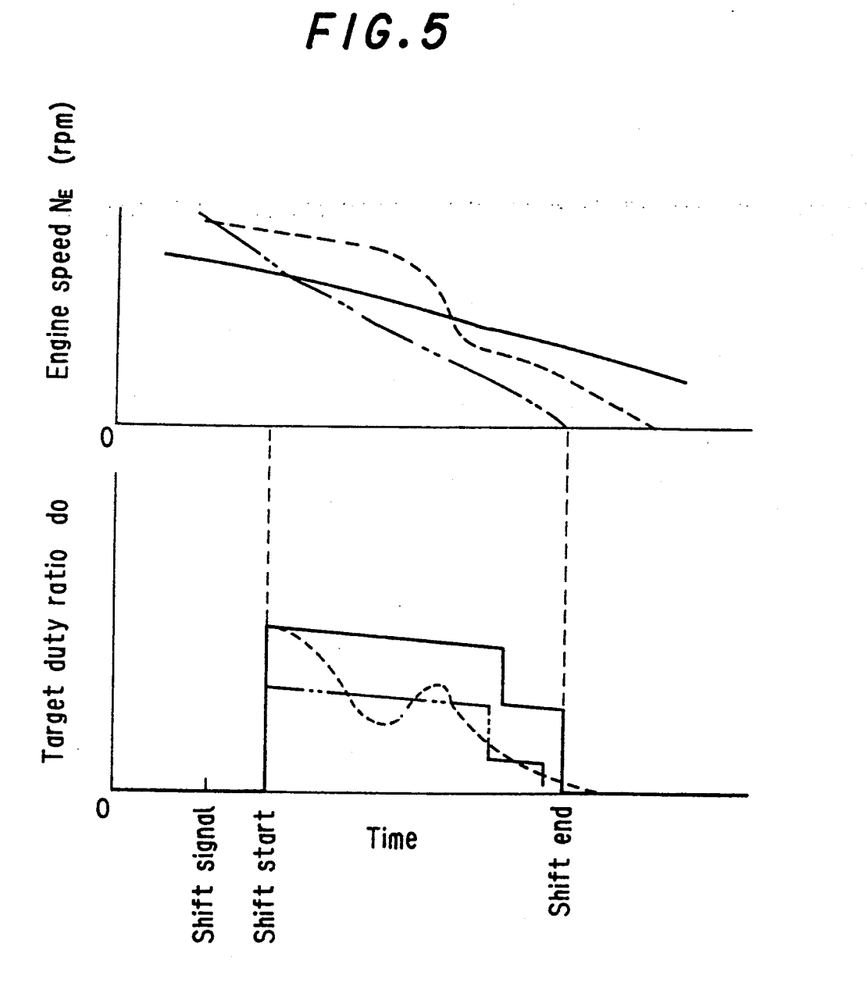
FIG. 5 is a graph showing an example of the relationship between the engine speed and a target duty ratio in this embodiment.

FIG. 5 shows the relationship between changes in the engine speed $N_E$ and the target duty ratio $d_O$ of the hydraulic control valve.

As can be seen from FIG. 5, when the engine speed $N_E$ slowly decreases with a small retardation rate as indicated by the solid line, the target duty ratio $d_O$ normally varies as indicated by the solid line. However, when the engine speed rapidly decreases with a large retardation rate as indicated by the two-dot-bar line, the target duty ratio $d_O$ of the hydraulic valve is set to a value lower than a normal target duty ratio $d_O$ as indicated by the two-dot-bar line. As a result, a higher pressure of hydraulic fluid is supplied to the engaging side frictional engaging element.

In the present invention, even when the engine speed $N_E$ decreases with irregular retardation rate as indicated by the broken line, the target duty ratio $d_O$ is always adequately set as indicated by the broken line.

Furthermore, in this embodiment, when the retardation rate $\alpha$ of the vehicle is large, the shift pattern from the 4th position is changed from 4-3-2 to 4-3-1 to improve the braking effect. Thus, when the retardation rate $\alpha$ of the vehicle is large, the shift pattern is changed from the normal case to improve the effect of engine brake, thereby improving safety of the vehicle at rapid braking.

Figure 1:
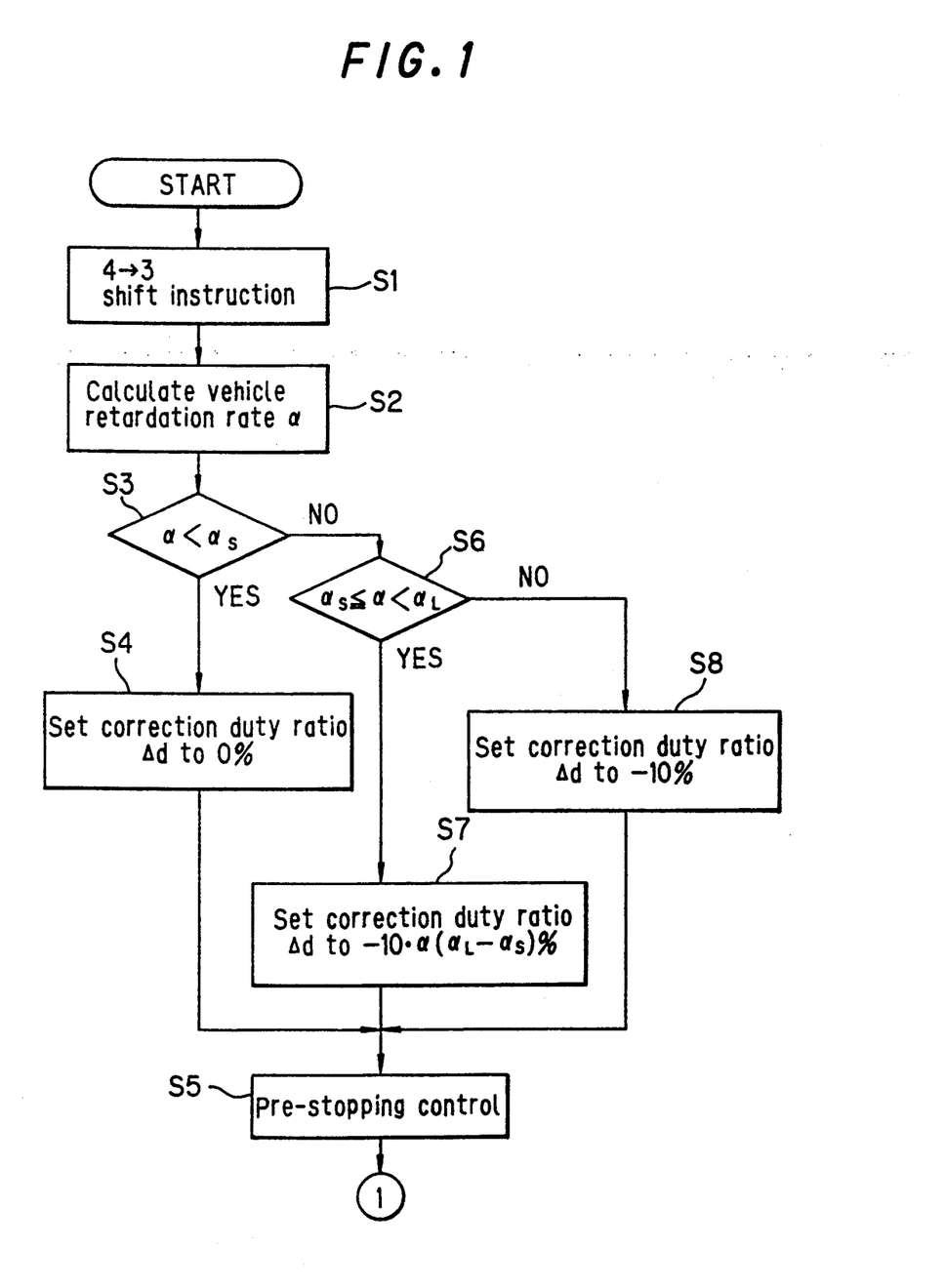
FIG. 1, along with FIG. 2, is a flow chart showing the control flow of an embodiment according to the shift control apparatus for an automatic transmission for a vehicle according to the present invention.
Figure 2:
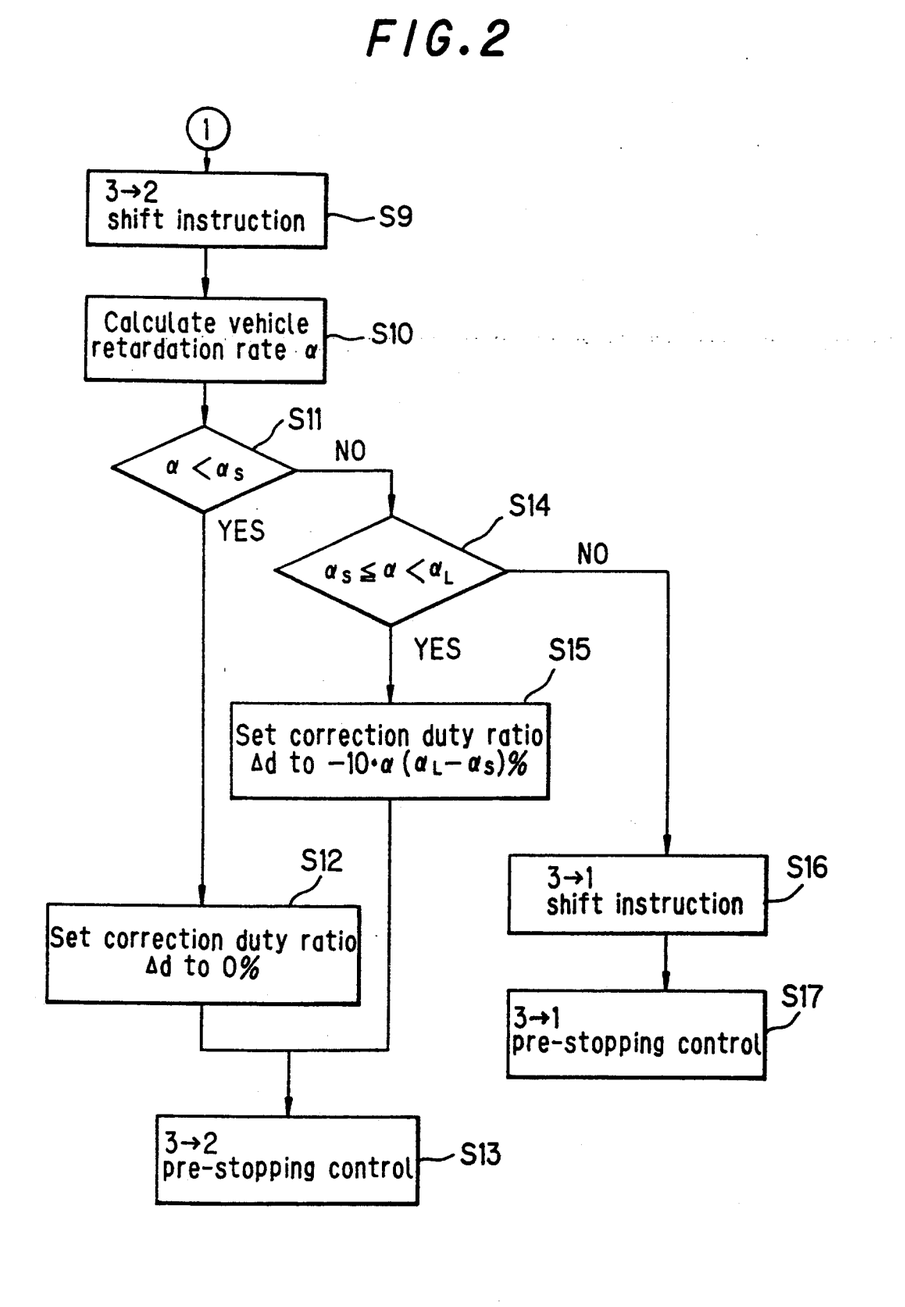
FIG. 2 is a flow chart showing the control flow of an embodiment according to the shift control apparatus for an automatic transmission for a vehicle according to the present invention.

The control flow of this embodiment is shown in FIG. 1 and FIG. 2.

Referring to FIG. 1 and FIG. 2, when a shift instruction from the 4th speed to the 3rd speed is generated in association with a decrease in the vehicle speed in step S1, the retardation rate $\alpha$ of the vehicle is calculated according to the detection signal from the rotation speed sensor 37 in step S2. In step S3, the retardation rate $\alpha$ is determined as to whether or not it is smaller than the smallest threshold value $\alpha_S$.

In step S3, when the retardation rate $\alpha$ of the vehicle is determined to be smaller than the smallest threshold value $\alpha_S$, that is, the retardation rate $\alpha$ of the vehicle is very small, in step S4 the correction duty ratio $\Delta d$ is set to $$\Delta d = 0\%$$

And a pre-stopping control from the 4th speed to the 3rd speed in association with retardation of the vehicle is performed in step S5.

When, in step S3, the retardation rate $\alpha$ of the vehicle is determined to be greater than the smallest threshold value $\alpha_S$, determination is made in step S6 as to whether or not the retardation rate $\alpha$ of the vehicle is between the smallest threshold value $\alpha_S$ and the largest threshold value $\alpha_L$. When the retardation rate $\alpha$ of the vehicle is determined to be between the smallest threshold value $\alpha_S$ and the largest threshold value $\alpha_L$, that is the retardation rate $\alpha$ of the vehicle is medium, in step S7 the correction duty ratio $\Delta d$ is set to $$\Delta d = -10 \cdot \alpha/(\alpha_L - \alpha_S)\%.$$

After that, the processing goes to step S5.

When, in step S6, the retardation rate $\alpha$ of the vehicle is determined not to be between the smallest threshold value $\alpha_S$ and the largest threshold value $\alpha_L$, that is, the retardation rate $\alpha$ of the vehicle is greater than the largest threshold value $\alpha_L$ and is very high, in step S8 the correction duty ratio $\Delta d$ is set to $$\Delta d = -10\%$$

Then, the processing goes to step S5.

After the pre-stopping control in association with retardation of the vehicle from the 4th speed to the 3rd speed is performed in step S5, when a shift instruction from the 3rd speed to the 2nd speed is generated in step S9 in association with further retardation of the vehicle, the retardation rate $\alpha$ of the vehicle is again calculated in step S10. Then, in step S11, determination is made as to whether or not the retardation rate $\alpha$ of the vehicle is smaller than the smallest threshold value $\alpha_S$.

When, in step S11, the retardation rate $\alpha$ of the vehicle is determined to be smaller than the smallest threshold value $\alpha_S$, that is, the retardation rate $\alpha$ of the vehicle is very small, in step S12 the correction duty ratio $\Delta d$ is set to $$\Delta d = 0\%$$

After that, pre-stopping control from the 3rd speed to the 2nd speed in association with retardation of the vehicle is performed in step S13.

After the pre-stopping control from the 3rd speed to the 2nd speed is performed, a creep control to suppress creeping of the vehicle is performed as needed.

When, in step S11, the retardation rate $\alpha$ of the vehicle is determined to be greater than the smallest threshold value $\alpha_S$, determination is made in step S14 as to whether or not the retardation rate $\alpha$ of the vehicle is between the smallest threshold value $\alpha_S$ and the largest threshold value $\alpha_L$. When the retardation rate $\alpha$ of the vehicle is determined to be between the smallest threshold value $\alpha_S$ and the largest threshold value $\alpha_L$, that is the retardation rate $\alpha$ of the vehicle is medium, in step S15 the correction duty ratio $\Delta d$ is set to $$\Delta d = -10 \cdot \alpha/(\alpha_L - \alpha_S)\%.$$

After that, the processing goes to step S13.

When, in step S14, the retardation rate $\alpha$ of the vehicle is determined not to be between the smallest threshold value $\alpha_S$ and the largest threshold value $\alpha_L$, that is, the retardation rate $\alpha$ of the vehicle is greater than the largest threshold value $\alpha_L$ and is very high, a shift instruction from the 3rd speed to the 1st speed is generated in step S17. This remarkably improves the effect of engine braking in association with rapid retardation over normal cases.

In this case, the rear clutch 21 as the engaging side frictional engaging element in the 1st speed, as can be seen from FIG. 7, is engaged in the 3rd speed, and a shift from the 3rd speed to the 1st speed is achieved by the action of the one-way clutch 25 which functions after the front clutch 20 and the 4th-speed clutch 22 are released. Therefore, no setting is required for the correction duty ratio $\Delta d$ and the target duty ratio $d_O$ of the hydraulic control valve.

Similarly to the above, after the pre-stopping control from the 3rd speed to the 1st speed is performed, a creep control to suppress creeping of the vehicle is performed as needed.

In this embodiment, the retardation rate of the vehicle is calculated according to the changing rate $\alpha$ in the rotation speed of the transmission output shaft 33 of the vehicle. However, alternatively, this may be calculated according to the rate of change in rotation speed of the transmission input shaft 19, which is integral with the turbine 15 of the torque converter 13, an acceleration sensor (G sensor) or the like.

What is claimed is:

1. In an automatic transmission for a vehicle having at least one frictional engaging element and an electromagnetic valve to control hydraulic pressure supplied to the frictional engaging element and achieving a plurality of speed ratios including a predetermined speed ratio achieved by engaging the frictional engaging element, a shift control apparatus comprises retardation rate detection means for detecting retardation rate of the vehicle and electromagnetic valve control means for controlling said electromagnetic valve according to a value detected by said retardation rate detection means.

2. The shift control apparatus of claim 1 wherein said electromagnetic valve control means controls the electromagnetic valve according to a detection value of said retardation rate detection means during a speed shift from another speed ratio to a predetermined speed ratio.

3. The shift control apparatus of claim 2 wherein said another speed ratio is a speed ratio higher by at least two steps than the predetermined speed ratio, and further comprising speed instruction means for instructing speed shift operation to the predetermined speed ratio when the retardation rate of the vehicle exceeds a predetermined value.

4. The shift control apparatus of claim 1 wherein said retardation rate detection means has output shaft rotation speed detection means for detecting an output shaft rotation speed of the automatic transmission of the vehicle to calculate the retardation rate of the vehicle according to a rate of change in the output shaft rotation speed.

5. The shift control apparatus of claim 1 wherein said retardation rate detection means has input shaft rotation speed detection means for detecting an input shaft rotation speed of the automatic transmission of the vehicle to calculate the retardation rate of the vehicle according to a rate of change in the input shaft rotation speed.

6. The shift control apparatus of claim 1 wherein said retardation rate detection means has acceleration detection means for detecting acceleration of the vehicle to calculate the retardation rate of the vehicle according to an output value from said acceleration detection means.

* * * * *